United States Patent [19]
Johnson

[11] Patent Number: 5,461,805
[45] Date of Patent: Oct. 31, 1995

[54] PANEL INSERT FOR TEMPORARY ATTACHMENT TO ANIMAL IDENTIFICATION TAGS

[75] Inventor: George N. Johnson, Stillwater, Minn.

[73] Assignee: Fearing Manufacturing Co., Inc., St. Paul, Minn.

[21] Appl. No.: 134,651

[22] Filed: Oct. 12, 1993

[51] Int. Cl.⁶ .......................................................... G09F 3/00
[52] U.S. Cl. .................................. 40/301; 40/300; 119/814
[58] Field of Search ........................ 40/300, 301; 119/814

[56] References Cited

U.S. PATENT DOCUMENTS

| | | |
|---|---|---|
| 3,731,414 | 5/1973 | Murphey et al. . |
| 4,021,952 | 5/1977 | Brierley . |
| 4,581,834 | 4/1986 | Zatkos . |
| 4,635,389 | 1/1987 | Oudelette . |
| 4,653,208 | 3/1987 | Wassilieff . |
| 4,696,119 | 9/1987 | Howe et al. . |
| 4,721,064 | 1/1988 | Denk et al. ............................... 40/301 |
| 4,920,672 | 5/1990 | Zatkos . |
| 4,953,313 | 9/1990 | Scott . |
| 5,016,369 | 5/1991 | Parry . |
| 5,152,249 | 10/1992 | Howe . |
| 5,308,351 | 5/1994 | Nehls ........................................ 40/301 |

FOREIGN PATENT DOCUMENTS

| | | |
|---|---|---|
| 0056533 | 12/1980 | European Pat. Off. . |
| 0717707 | 1/1932 | France . |
| 2489445 | 3/1982 | France . |
| 2510205 | 1/1983 | France ............................... F16B 5/04 |
| 8102068 | 11/1982 | Netherlands . |
| 2041833 | 9/1980 | United Kingdom . |

Primary Examiner—Brian K. Green
Assistant Examiner—Cassandra Davis
Attorney, Agent, or Firm—Jacobson & Johnson

[57] ABSTRACT

An animal-identification component including a flexible and deformable panel for carrying animal-identification information, with the panel being sufficiently flexible and deformable to flex and bend to minimize snagging of the panel on objects which contact the panel, and a panel retainer for securing the panel to a stud, with the panel retainer having a flange with an opening therein, and the panel retainer made of material sufficiently rigid to resist flexing and deforming, with the flange having a face for engaging a sufficiently large portion of the flexible and deformable panel to prevent the panel retainer from being drawn through an opening in the flexible and deformable panel, and the panel having a frangible neck extension for frictionally engaging the sidewalls of an opening in the panel to maintain the panel and the panel retainer as a unit prior to attachment of the panel to an animal.

22 Claims, 3 Drawing Sheets

PANEL INSERT FOR TEMPORARY ATTACHMENT TO ANIMAL IDENTIFICATION TAGS

FIELD OF THE INVENTION

This invention relates to animal identification tags and, more specifically, to improvements to animal identification tags which permit a person to increase the holding strength of the tag without having to resize the applicators.

BACKGROUND OF THE INVENTION

One of the difficulties with animal identification tags is that, to prevent snagging of the tag on brush or fences, the large panel carrying the animal identification panel should be sufficiently pliable to enable it to flex and bend in response to the panel's snagging on brush or fences.

On the other hand, the large panel needs to be retained on the animal by a stud having a head that will not be drawn through the soft panel. Typically, the prior-art animal identification panels have been made with an enlarged region called a "boss" which is located around the hole in the animal identification panel.

Generally, the amount of holding strength (i.e., the force necessary to pull the stud head backward through the boss) is limited by the material used in the manufacture of the animal identification panel; that is, the softer the material, the less holding strength. In addition, the impregnation of panels with insecticides further increases the flexibility of the panel, thus reducing the holding strength of the tag. Thus, while the tag may flex and bend to avoid snagging, the panel may actually pull free of the stud if the panel is made of a too-soft material.

The boss could be made with greater thickness or an increased size to provide greater resistance to withdrawal, but this would require having a different size applicator to hold the tag during application to an animal.

The present invention enables a person to use a separate panel retainer made of material with properties different from the panel which would substantially increase the holding strength of the animal tag, yet retain the ability of the panel to flex and bend to minimize the panel's snagging on fences, brush or the like. In addition, since the increased withdrawal strength can be obtained by using materials of different relative strengths, the user does not need a special applicator to apply the tag because the outer dimension of the panel insert of the present invention can be identical to those of the bosses on prior-art tags.

Other types of animal identifications tags have used metal washers or the like to engage a portion of the tag. The present invention provides an improved animal identification tag which has a panel insert with a frangible extension for temporarily securing the panel insert to the animal identification panel during the pre-application and application processes, thus enabling a person to attach the panels and panel inserts of the present invention to an animal using existing applicators normally used for attaching studs to animal identification panels having integral bosses. Thus, one using the present invention can use the same applicator to apply panels with integral bosses as well as panels containing the panel insert of the present invention.

DESCRIPTION OF THE PRIOR ART

U.S. Pat. No. 5,152,249 shows a stud for forcing through an animal's ear to attach an identification tag to an animal.

U.S. Pat. No. 5,016,369 shows a two-piece ear tag with a puncturable container-like member located on the tag for holding a disinfectant therein.

U.S. Pat. No. 4,920,671 shows a two-piece ear tag with a panel having an enlarged boss.

U.S. Pat. No. 4,696,119 shows a two-piece ear tag and applicator for applying the tag to an animal's ear.

U.S. Pat. No. 4,653,208 shows a tag having a boss for securing a stud thereto.

Great Britain patent 2,041,833 shows an animal ear tag having a metal-spring slip for engaging a brass, hollow rivet to prevent tampering with the tag.

U.S. Pat. No. 4,581,834 shows an animal ear tag with a stud and a panel having a boss with an inert for locating within the boss to hinder removal of the stud.

U.S. Pat. No. 4,635,389 shows an animal ear tag having a boss insert, with the insert split for positioning within the boss to hinder withdrawal of the stud from the identification tag.

U.S. Pat. No. 4,953,313 shows another embodiment of a boss insert which has a partial split for inserting in the boss of the flexible panel.

European patent 56538 shows a two-piece ear tag with a cap positioned over the boss to render the tag tamper evident.

French patent 2,489,445 shows an animal ear tag with various types of inserts located in the boss of the panel carrying the animal-identification information.

French patent 717,707 shows a closed container for placing over the tip of the stud.

U.S. Pat. No. 4,021,952 shows a three-part tag with a pin for extending through the members carrying the animal identification information.

U.S. Pat. No. 3,731,414 shows a two-piece ear tag with a boss extending from both sides of the tag.

The Netherlands patent 8,102,068 shows an animal ear tag with a retaining collar for preventing withdrawal of the stud.

French patent 2,510,205 shows a two-piece ear tag with a metal insert for preventing withdrawal of the stud.

U.S. Pat. No. 4,497,321 shows an applicator for applying a two-piece ear tag to an animal.

SUMMARY OF THE INVENTION

Briefly, the present invention comprises a panel retainer for securing a flexible panel to an animal with the panel retainer having a flange made of sufficiently rigid material to resist flexing and deformation of the panel retainer with the flange having a panel-supporting face, and a frangible neck extension for frictionally engaging the panel prior to attachment of the panel to an animal to hold the panel retainer in assembly position on the panel until the panel retainer is locked to a stud with the applicator.

DESCRIPTION OF THE PREFERRED EMBODIMENT

Figure 1:
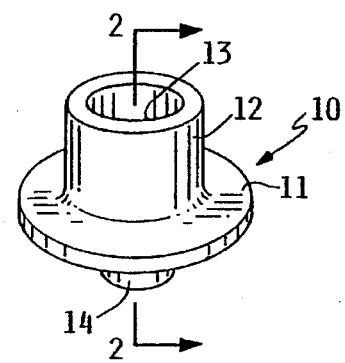
FIG. 1 shows a perspective view of the panel retainer of my invention.

FIG. 1 reference numeral 10 generally identifies the panel retainer of the present invention. Panel retainer 10 includes a flange 11, a collar 12 with a recess 13 therein and a frangible neck extension 14. Typically, panel retainer 10 is made of a polymer plastic such as polyethylene and has sufficient rigidity to prevent flexing and bending in response to forces encountered as the animal snags the tag on brush or the like.

Figure 2:
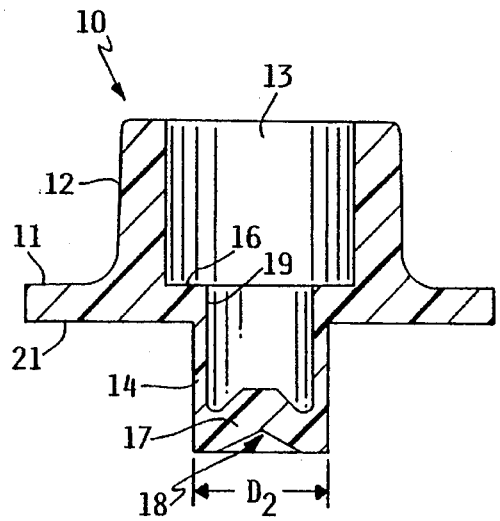
FIG. 2 shows a cross-sectional view of the panel retainer of FIG. 1 taken along line 2—2 of FIG. 1.

FIG. 2 shows the panel retainer in cross section with one end of a frangible neck extension 14 connected to flange 11, and the opposite end of frangible neck extension 14 having a stud-centering member 17 therein with a conical recess 18 therein for receiving a tip of an ear-piercing stud. An annular face 21 extends around the interior of flange 11 for forming supporting engagement with a portion of a flexible panel.

Figure 3:
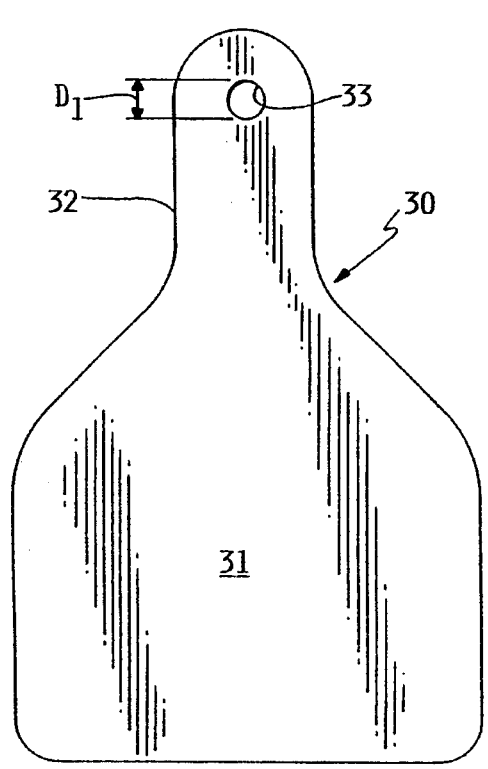
FIG. 3 shows a front-view of a flexible panel for carrying animal identification information.

FIG. 3 shows a flexible panel 30 having an identification-carrying area 31, a neck 32 and an opening 33 therein for insertion of a stud therethrough. The diameter of the opening 33 is designated by $D_1$, and the diameter of frangible neck extension 14 is designated in FIG. 2 by $D_2$ with $D_2$ being slightly larger than $D_1$ to provide an interference fit between panel 30 and frangible neck extension 14.

Figure 4:
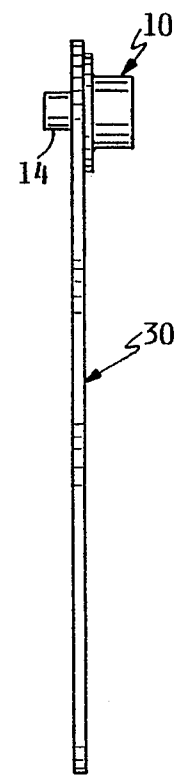
FIG. 4 shows the panel retainer temporarily secured to the flexible panel of FIG. 3.

FIG. 4 shows the animal-identification component of the present invention comprising flexible panel 30 of FIG. 3 carrying panel retainer 10 with neck extension 14 extending through and frictionally engaging the sidewalls of opening 33 in panel 30.

Figure 5:
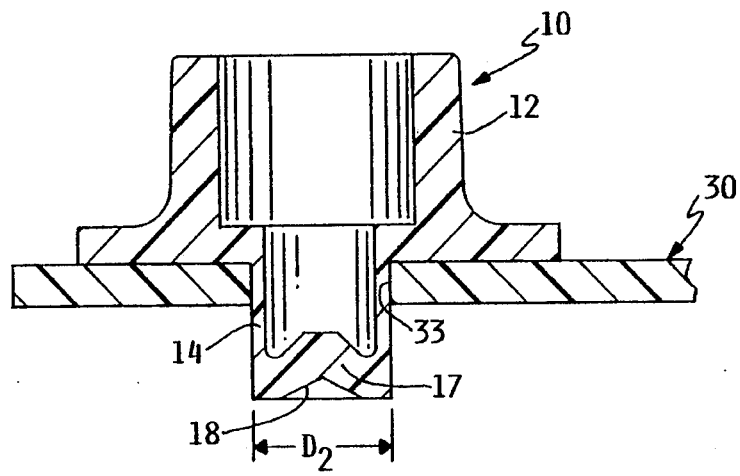
FIG. 5 shows the coaction of the panel retainer and the flexible panel.
Figure 6:
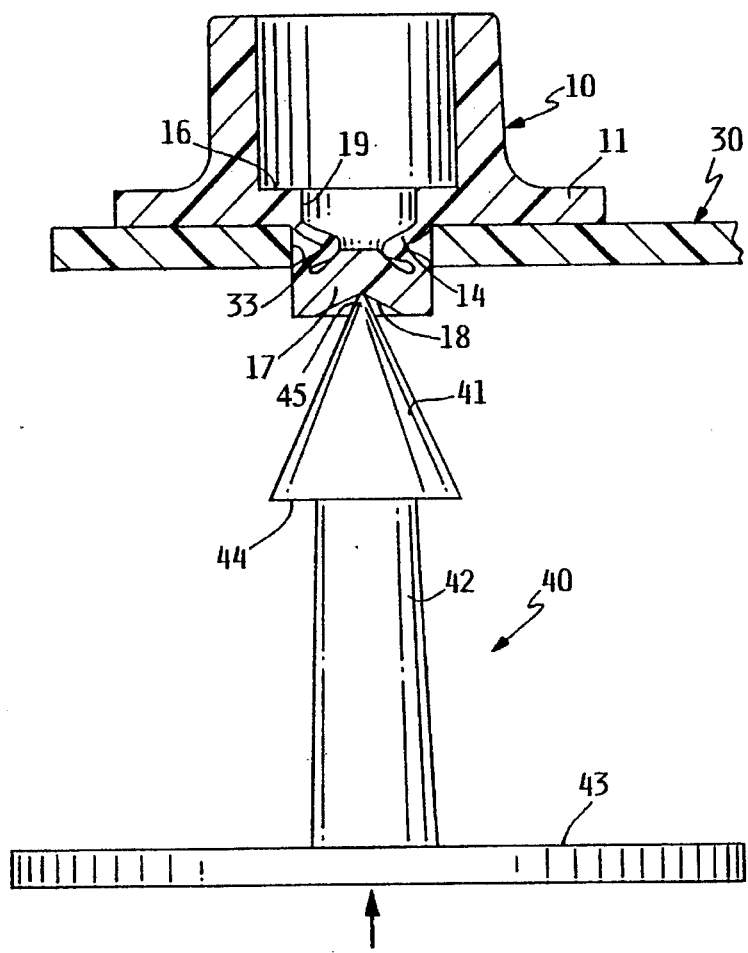
FIG. 6 illustrates the fracturing of the frangible neck on the panel retainer as a stud is inserted into the panel retainer.

FIGS. 5 and 6 show the action of panel retainer 10 with panel 30 and stud 40. FIG. 5 illustrates panel retainer 10 being frictionally held in opening 33 in flexible panel 30 through the coaction of frangible neck extension 14 with the sidewalls of opening 33. That is, the outside diameter $D_2$ is sufficiently large to form frictional engagement with the sidewalls of opening 33 in panel 30. By forming frictional engagement with neck extension 14, the panel retainer is held in place on the panel in a temporary position with sufficient restraint to permit handling of the composite panel and panel retainer as a single unit prior to insertion of the panel and panel retainer into an applicator.

FIG. 6 reference numeral 40 identifies an animal-identification stud having a conical head 41, a retaining shoulder 44, a stem 42 and a flange 43 for securing against one side of the animal. In operation and assembly of stud 42 of panel retainer 10, an applicator such as shown in U.S. Pat. No. 4,497,321 is used to force stud head 41 through the animal's ear, through opening 33 and into panel retainer 10 where shoulder 44 engages shoulder 16 of panel insert 10. The stud head may be made partially of stiff resilient material and partially of resilient material to permit deformation of the outer portion of the stud head to enable one to force the stud head through opening 33 in the flexible panel 30 and through opening 19 in panel insert 10.

FIG. 6 illustrates, as conical head 41 is pushed forward through the animal's ear, tip 45 engages stud-centering member 17 of frangible extension 14 and centers itself thereto by alignment with conical recess 18 located therein. Since neck 14 is frangible, a continued force on stud 40 (indicated by arrow) causes neck 14 to bend and break as stud head 41 is driven through panel 30 and through opening 19 in flange 11. In many cases, the application process severs the entire frangible neck extension 14 and self-centering member 17 from panel insert 10. Since the main purpose of panel frangible neck extension 14 is to hold panel insert 10 in position during the pre-application and the application processes, the breakage of frangible neck extension 14 does not interfere with the subsequent operation of the animal tag since the annular shoulder 44 of head 41 engages the shoulder 16 of panel insert 10 to prevent withdrawal of stud 40.

Figure 7:
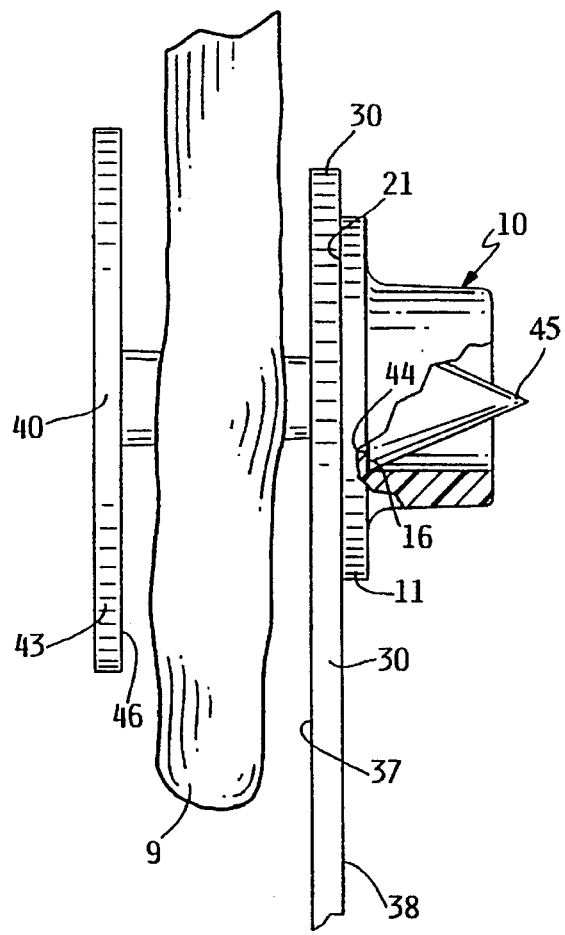
FIG. 7 shows a partial cut away view of a flexible panel for carrying animal identification information secured to an animal ear through a stud and a panel retainer.

FIG. 7 shows the assembly of stud 40, panel 30 and panel retainer 10 around an ear 9. In the assembled position, flange 43 has an annular inner face 46 for engaging one side of the ear; and, similarly, the opposite panel 30 has a face 37 for engaging the opposite side of ear 9. Flange 11 on panel retainer 10 has a face 21 for supporting and engaging a portion of panel 30 to prevent withdrawal of panel retainer 10 through opening in panel 30; that is, panel retainer 10, being made of a more rigid and substantially inflexible material, maintains its integrity while allowing the panel to flex, move and bend in response to snagging of the panel on external objects. Even though the panel may temporarily snag on an object, the panel can flex and bend away and the panel-retainer member prevents its withdrawal from the head of the stud. It should be pointed out that panel 30, while flexible and pliable, has sufficient tear resistance so that, under conditions normally encountered with animal ear tags, the unreinforced panel does not tear free of the stud if the panel snags on a fence or the like.

Figure 8:
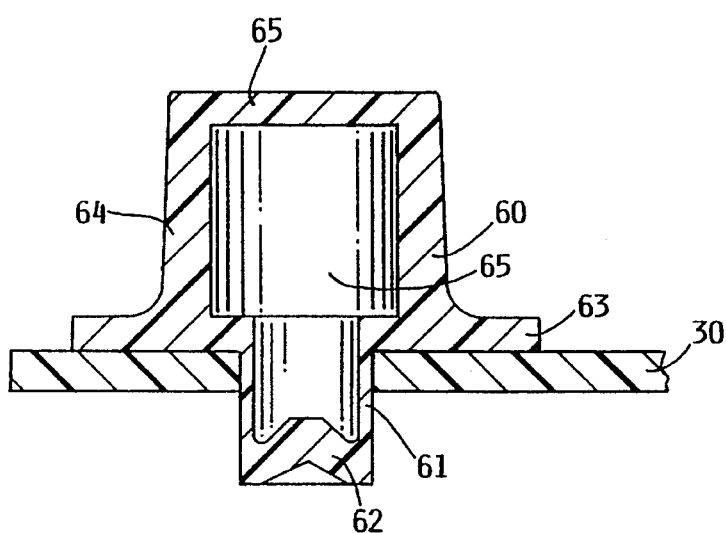
FIG. 8 shows a panel retainer having a closed top to inhibit tampering thereof.

FIG. 8 shows an alternate embodiment of my panel retainer identified by reference numeral 60. Panel retainer 60 contains a frangible extension 61, a stud-centering member 62, a flange 63 and a cylindrical collar 64. Located on the top portion of cylindrical collar 64 is a cap 65 which hinders tampering with the ear tag; that is, when the stud is assembled and located in recess 66 in panel retainer 60, a person cannot cut the stud to remove it from the panel, since the head of the stud will remain in recess 66 and interfere with the use of the panel insert with another stud. To remove the stud, a person would have to tamper with the cover or pull the head of the stud backward through the panel insert. Since such tampering would be evident, a person is alerted to the fact that the tag has been tampered with. In addition, with the embodiment of FIG. 8, the panel retainer 60 can be made of relatively stiff material having sufficient holding strength to rupture the stem of the stud if someone attempts to withdraw the stud from the panel insert. Consequently, the combination of the stud and the cap 65 provides a tamper-resistant, tamper-evident animal identification tag to foil persons who may want to switch identification tags on an animal.

Generaly, attaching an animal ear tag to an animal includes the steps of: temporarily securing a panel insert 10 to flexible panel 30 having a surface 31 for carrying animal identification information by forcing a frangible extension 17 into frictional engagement with flexible panel 30 to temporarily secure the panel insert 10 to the flexible panel 30; insertion of the panel insert and panel into one jaw of an applicator and a stud into the other jaw of the applicator which drives conical head 41 of stud 40 through opening 33 in the panel with sufficient force to fracture the frangible extension 14. Fracturing frangible extension 14 enables head 41 of stud 40 to pass through opening 33 in panel insert 10, seating stud shoulder 44 on shoulder 16 of panel insert 10 shoulder 16 to prevent withdrawal of stud 40 therefrom.

Panel 10 is sufficiently flexible to allow the pointed head 41 to pass through opening 33, yet sufficiently rigid to prevent withdrawal of the the stud unless the stud is damaged.

To appreciate the relative differences between materials useable in the stud and the panel the following illustrates materials suitable for use with the present invention. While a panel, which requires flexibility to prevent snagging on brush or a fence, may be made of polyurethane or the like, such a panel may have a typical flexural modulus of about 12,000 p.s.i. In contrast, the panel retainer 10 may be made from low-density polyethylene which may have a flexural modulus ranging from 40,000 p.s.i. to 105,000 p.s.i. or, if greater, holding strength is required from high density polyethylene which may have a flexural modulus of about 155,000 p.s.i. to 158,000 p.s.i. Thus, the present invention provides for multiple combinations that are suited for the particular application; that is, if a tamper-evident tag is desired, the materials with higher flexural modulus would be used with a panel insert with a cap, since a stud being withdrawn would rupture, alerting a person to evidence of tampering with the animal identification tag.

While my panel insert is shown as being temporarily attached to the panel, if desired one could permanently fasten the panel insert to the panel to creat an animal ear tag where the stud holding strength of the combination of the panel insert and the panel was independent of the strength or flexibility of the materials used in the panel. Typical means for permanently attaching the panel inert to the panel is through the use of adhesives compatible to both the materials of the panel and the panel insert.

I claim:

1. An animal-identification component, comprising:

a flexible and deformable panel having a first flexural modulus for carrying animal-identification information, said panel sufficiently flexible and deformable to flex and bend to minimize snagging of the panel on objects which contact the panel, said panel including an opening therein; and a panel retainer of a second flexural modulus for engagement with the panel, said panel retainer having a flange with an opening therein, said panel retainer made of material sufficiently rigid to resist flexing and deforming of said panel retainer, said flange having a face for engaging a sufficiently large portion of the flexible and deformable panel to prevent the panel retainer from being drawn through the opening in the flexible and deformable panel, said panel retainer having a hollow frangible neck extension with a peripheral wall for frictionally engaging the opening in the panel to maintain said panel and said panel retainer as a unit prior to attachment of the panel to an animal whereby the peripheral wall of the neck extension is adapted to deform when a stud is inserted therethrough.

2. The animal-identification component of claim 1 wherein said panel is substantially flat and uniformly thick.

3. That animal-identification component of claim 1 wherein said panel is made of polyurethane.

4. The animal-identification component of claim 1 further comprising a stud including a head, wherein the panel retainer has a collar with a recess therein for receiving the head of the stud.

5. The animal-identification component of claim 1 wherein the panel retainer includes an annular panel-supporting face.

6. The animal identification component of claim 1 further comprising a stud including a head, wherein said panel retainer includes an annular shoulder for supporting the head of the stud therein.

7. The animal-identification component of claim 1 further comprising a stud including a tip, wherein said frangible neck extension includes a stud-centering member for receiving the tip of the stud for attachment to the panel retainer.

8. The animal-identification component of claim 1 further comprising a stud including a head, the stud being piercable through the flesh of an animal and being insertable through the frangible extension of the panel retainer, the frangible extension of the panel retainer being fractured during assembly of said stud to said panel retainer.

9. The animal-identification component of claim 1 further comprising a stud including a stud head, wherein said second flexural modulus is greater than said first flexural modulus to prevent withdrawal of the stud head from said panel retainer.

10. A panel retainer for temporary attachment to a panel for carrying animal-identification information, the panel retainer and panel being attachable to an animal, said panel retainer having a flange with an opening therein, said panel retainer made of material sufficiently rigid to resist flexing and deforming of said panel retainer, said flange having a panel-supporting face, said panel retainer having a hollow frangible neck extension with a peripheral wall for temporarily securing the panel retainer in position for engaging a hole in the panel prior to attachment of the panel retainer to the animal, the peripheral wall of the neck extension is adapted to deform when the a stud is inserted therethrough.

11. The panel retainer of claim 10 further comprising a stud including a head, wherein said panel retainer includes a collar with a recess therein for receiving the head of the stud.

12. The panel retainer of claim 10 wherein said panel retainer is made of a polymer plastic.

13. The panel retainer of claim 10 wherein said panel retainer includes a frangible extension for frictionally engaging the panel.

14. The method of attaching an animal ear tag to an animal comprising the steps of:

temporarily securing a panel insert to a flexible panel having a surface for carrying animal-identification information, the surface defining a plane and the panel insert at least partially breaking the plane when being secured to the flexible panel; and driving a head of a stud through an opening in the panel insert to secure the stud to the panel insert and flexible panel and to attach the animal ear tag to the animal, the insert having a hollow frangible extension with a peripheral wall which is deformed after the stud has been inserted therethrough.

15. The method of claim 14 wherein the step of securing the panel insert to the flexible panel comprises the step of forcing the frangible extension into frictional engagement with the flexible panel to temporarily secure the panel insert to the flexible panel.

16. The method of claim 14 wherein the step of driving comprises the step of fracturing the frangible extension to secure the stud to the panel insert.

17. An animal-identification component for attachment to an animal with a stud engagable to the component, comprising:

a flexible and deformable panel having a first flexural modulus for carrying animal-identification information, said panel sufficiently flexible and deformable to flex and bend to minimize snagging of the panel on objects which contact the panel, said panel including an opening therein for the stud and two opposing surfaces generally defining planes; and a panel retainer of a second flexural modulus for securing the panel to the stud, said panel retainer having a flange with an opening therein, said panel retainer made of material sufficiently rigid to resist flexing and deforming of said panel retainer, said flange having a face for engaging a sufficiently large portion of the flexible and deformable panel to prevent the panel retainer from being drawn through the opening in the flexible and deformable panel, said panel retainer having an hollow frangible neck extension for frictionally engaging the opening in the panel to maintain said panel and said panel retainer as a unit prior to attachment of the panel to an animal the extension breaking one of the planes when frictionally engaging the opening in the panel, whereby the peripheral wall of the extension is adapted to deform when the a stud is inserted therethrough.

18. An animal-identification component for attachment to an animal with a stud engagable to the component, comprising:

a flexible and deformable panel having a first flexural modulus for carrying animal-identification information, said panel sufficiently flexible and deformable to flex and bend to minimize snagging of the panel on objects which contact the panel, said panel including an opening therein for the stud and opposite panel sides; and a panel retainer of a second flexural modulus for securing the panel to the stud, said panel retainer having a flange with an opening therein, said panel retainer made of material sufficiently rigid to resist flexing and deforming of said panel retainer, said flange having a face for engaging a sufficiently large portion of the flexible and deformable panel to prevent the panel retainer from being drawn through the opening in the flexible and deformable panel, said panel retainer having a hollow frangible neck extension with a peripheral for frictionally engaging the opening in the panel to maintain said panel and said panel retainer as a unit prior to attachment of the panel to an animal, the panel retainer being disposed on each of the sides of the panel when the neck extension frictionally engages the opening in the panel whereby the peripheral wall of the neck extension is adapted to deform when the a stud is inserted therethrough.

19. The component of claim 18 wherein the panel retainer further comprises a collar for engaging the stud, the neck extension and collar being disposable on opposite sides of the panel.

20. An animal-identification component for attachment to an animal with a stud engagable to the component, comprising:

a flexible and deformable panel having a first flexural modulus for carrying animal-identification information, said panel sufficiently flexible and deformable to flex and bend to minimize snagging of the panel on objects which contact the panel, said panel including an opening therein for the stud; and a panel retainer of a second flexural modulus for securing the panel to the stud, said panel retainer having a flange with an opening therein, said panel retainer made of material sufficiently rigid to resist flexing and deforming of said panel retainer, said flange having a face for engaging a sufficiently large portion of the flexible and deformable panel to prevent the panel retainer from being drawn through the opening in the flexible and deformable panel, the panel retainer further having a collar for engaging the stud, the flange and collar being disposed at generally a right angle to each other, the flange being disposed between the collar and the panel when the panel retainer is engaged with the stud, the flange extending outwardly from the collar when the panel retainer is engaged with the stud such that the face engages said sufficiently large portion of the panel, the panel retainer having a hollow frangible neck extension with a peripheral wall which is adapted to deform as a stud is inserted therethrough.

21. The component of claim 20 further comprising securing means for at least temporarily securing the panel retainer to the panel such that the panel and panel retainer are maintained as a unit prior to attachment of the panel to an animal.

22. The component of claim 21 wherein the securing means comprises a neck extension on the panel retainer for frictionally engaging the opening in the panel.

\* \* \* \* \*